United States Patent
Feinauer et al.

(10) Patent No.: US 10,099,668 B2
(45) Date of Patent: Oct. 16, 2018

(54) METHOD AND DEVICE FOR OPERATING A VEHICLE

(71) Applicant: Robert Bosch GmbH, Stuttgart (DE)

(72) Inventors: Jochen Feinauer, Neuenstein (DE); Alfred Strehle, Fellbach (DE); Markus Mengelkamp, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 39 days.

(21) Appl. No.: 15/501,397

(22) PCT Filed: Jun. 16, 2015

(86) PCT No.: PCT/EP2015/063428
§ 371 (c)(1),
(2) Date: Feb. 2, 2017

(87) PCT Pub. No.: WO2016/020093
PCT Pub. Date: Feb. 11, 2016

(65) Prior Publication Data
US 2017/0232942 A1    Aug. 17, 2017

(30) Foreign Application Priority Data
Aug. 4, 2014 (DE) .................. 10 2014 215 306

(51) Int. Cl.
*B60T 8/34* (2006.01)
*B60T 8/175* (2006.01)
(Continued)

(52) U.S. Cl.
CPC ............. *B60T 8/175* (2013.01); *B60T 8/172* (2013.01); *B60T 8/17636* (2013.01); *B60T 2210/124* (2013.01)

(58) Field of Classification Search
CPC ...... B60T 8/175; B60T 8/172; B60T 8/17636; B60T 2210/124
(Continued)

(56) References Cited

U.S. PATENT DOCUMENTS 6,322,167 B1   11/2001   Pruhs et al.
6,375,280 B1    4/2002   Poggenburg et al.
(Continued)

FOREIGN PATENT DOCUMENTS

DE   4410937 C1   8/1995
GB   2323138 A    9/1998
(Continued)

OTHER PUBLICATIONS

International Search Report for PCT/EP2015/063428, dated Sep. 11, 2015.

*Primary Examiner* — Pamela Rodriguez
(74) *Attorney, Agent, or Firm* — Norton Rose Fulbright US LLP; Gerard Messina

(57) ABSTRACT

A method is described for operating a vehicle, including the following steps: determining a respective traction of the vehicle wheels; determining which of the respective tractions of the vehicle wheels per axle of the vehicle is the highest traction; determining which of the respective highest tractions per axle is the lowest traction; controlling a admission pressure-generating device as a function of the determined lowest traction of the respective highest tractions per axle such that the admission pressure-generating device regulates a brake pressure in a single-channel brake circuit for the vehicle wheels as a function of the determined lowest traction such that the vehicle is decelerated according to the regulated brake pressure. Also described are a corresponding device, a corresponding system, and a computer program product.

8 Claims, 2 Drawing Sheets

(51) Int. Cl.
  *B60T 8/172* (2006.01)
  *B60T 8/1763* (2006.01)

(58) Field of Classification Search
  USPC ....... 303/113.2, 113.3, 114.1, 150, 151, 155,
           303/171, 174; 701/73, 74, 75, 78, 83
  See application file for complete search history.

(56) References Cited

U.S. PATENT DOCUMENTS

| | | |
|---|---|---|
| 6,381,531 B1 | 4/2002 | Schmidt |
| 6,644,758 B1 | 11/2003 | Stumpe |
| 2005/0234628 A1 | 10/2005 | Luders et al. |
| 2010/0131145 A1 | 5/2010 | Ryu et al. |

FOREIGN PATENT DOCUMENTS

| | | | |
|---|---|---|---|
| JP | H05278592 A | | 10/1993 |
| JP | 2004255907 A | | 9/2004 |
| JP | 2008290474 A | | 12/2008 |
| WO | WO-9605993 A1 | * | 2/1996 |

* cited by examiner

METHOD AND DEVICE FOR OPERATING A VEHICLE

FIELD OF THE INVENTION

The present invention relates to a method and a device for operating a vehicle. The present invention furthermore relates to a system for a vehicle and to a computer program product.

BACKGROUND INFORMATION

Electronic stability program (ESP) regulation systems are known that use a pressure generating device to actively build up the brake pressure required for an ESP regulation or VAF functions via a pump and ensure safe braking of a vehicle via multiple channel control using a subordinate anti-lock braking system (ABS) regulating algorithm. The abbreviation "VAF" stands for "Value Added Function," which means salable added functions, such as hill start assist, emergency brake assist, etc.

Regulating systems and their algorithms, which are designed as two-channel or four-channel systems, are known. Likewise known is arbitration by axle according to the so-called Select High and Select Low principles.

SUMMARY

An object of the present invention is to provide a method for operating a vehicle that makes it possible to safely brake or decelerate the vehicle using a single-channel brake circuit.

The object of the present invention is furthermore to indicate a corresponding device for operating a vehicle.

The object of the present invention is also to provide a corresponding system for a vehicle.

The object of the present invention is furthermore to indicate a corresponding computer program product.

According to one aspect of the present invention, a method for operating a vehicle is provided that includes the following steps:

Determining a respective traction of the vehicle wheels;
Determining for each axle of the vehicle which of the respective tractions of the vehicle wheels is the highest traction;
Determining which of the respective highest tractions for each axle is the lowest traction;
Controlling an admission pressure-generating device as a function of the determined lowest traction of the respective highest tractions for each axle, so that
The admission pressure-generating device regulates a brake pressure in a single-channel brake circuit for the vehicle wheels as a function of the determined lowest traction, so that
The vehicle is decelerated according to the regulated brake pressure.

According to another aspect of the present invention, a device for operating a vehicle is provided, including:
A processor
A memory, and
A program,
The program being stored in the memory and being configured to be executed on the processor, the program having instructions for:
Determining a respective traction of the vehicle wheels;
Determining for each axle of the vehicle which of the respective tractions of the vehicle wheels is the highest traction;
Determining which of the respective highest tractions for each axle is the lowest traction;
Controlling an admission pressure-generating device as a function of the determined lowest traction of the particular highest tractions for each axle, so that
The admission pressure-generating device is able to regulate a brake pressure in a single-channel brake circuit for the vehicle wheels as a function of the determined lowest traction, so that
The vehicle may be decelerated according to the regulated brake pressure.

According to another aspect of the present invention, a system is provided for a vehicle, the system including the device of the present invention and furthermore an admission pressure-generating device that is designed to regulate a brake pressure in a single-channel brake circuit for the vehicle wheels of the vehicle.

Another aspect of the present invention provides a computer program product having instructions that are configured to be executed on a processor and that when executed on the processor of the device of the present invention or the system of the present invention cause the device or system to execute the method of the present invention.

According to another aspect of the present invention, a vehicle that includes the device of the present invention or the system of the present invention is provided.

The present invention thus includes in particular the idea of applying the Select High principle for each axle of the vehicle. The Select High principle states that the vehicle wheel with the lowest tendency to lock up, that is, the vehicle wheel with the greatest traction, determines the collective brake pressure in the brake circuit.

According to the present invention, it is then provided that a Select Low arbitration is conducted between the two Select High results (for two axles, the invention being scalable as desired—for instance, three, four, five, or six axles are provided). The Select Low arbitration is an arbitration based on the Select Low principle. The Select Low principle states that the vehicle wheel with the greatest tendency to lock up, that is, the vehicle wheel with the lowest traction, determines the collective brake pressure in the brake circuit. The result of this Select Low arbitration (that is, the determined lowest traction) is used for controlling the admission pressure-generating device. This means that the result of this Select Low arbitration is used as the basis for corresponding control signals for the admission pressure-generating device.

Using the steps of the present invention of applying the Select High principle and the Select Low principle, it is possible to advantageously arrive at a suitable compromise with respect to brake performance, stability, and steerability of the vehicle on all driving surfaces, including their transitions. Safe braking of the vehicle using an admission pressure variation (single channel) is thus made possible. Therefore, this advantageously also provides redundancy with respect to ESP control systems and/or ABS control systems possibly already present in the vehicle. "ESP" stands for electronic stability program. "ABS" stands for anti-lock braking system.

According to one specific embodiment, the admission pressure-generating device is a brake booster. The brake booster is, for instance, an electromechanical brake booster. The brake booster is in particular a so-called iBooster as developed by the Robert Bosch company.

The fact that the brake circuit is a single-channel brake circuit means in particular that this brake circuit decelerates or brakes all of the vehicle wheels. This means that no individual deceleration of the vehicle wheels is provided. Rather, all of the vehicle wheels are decelerated or braked using the single-channel brake circuit. The regulation is therefore a single-channel regulation.

According to one specific embodiment of the invention, it is provided that the instantaneous tractions of all wheels and an instantaneous vehicle deceleration are determined during the deceleration according to the regulated brake pressure, the lowest instantaneous traction being determined if the instantaneous vehicle deceleration is greater than or equal to a predefined vehicle deceleration threshold value, and the admission pressure-generating device being controlled as function of the lowest instantaneous traction so that the admission pressure-generating device regulates the brake pressure in the brake circuit as a function of the lowest instantaneous traction, so that the vehicle is further decelerated according to the regulated brake pressure.

In particular this has the technical advantage that the tires are preserved. In particular, the technical advantage of the prevention of suddenly occurring yawing moments in the case of a reduction in road grip on one side is achieved. This means that, in this specific embodiment, the arbitration is performed according to a vehicle-wide Select Low principle starting when a predefined vehicle deceleration is reached. Therefore, this occurs especially during vehicle braking or vehicle deceleration on anti-skid driving surfaces. This means that the instantaneous lowest traction is used as the basis for regulating the brake pressure in the single-channel brake circuit starting at the predefined vehicle deceleration. The predefined vehicle deceleration is, in particular, a preset value that is permanently stored in the device, for example.

According to another specific embodiment, it is provided that when up to one vehicle wheel per axle locks up during vehicle deceleration, the wheel lockup is permitted so that the admission pressure-generating device is controlled independently of the wheel lockup, so that the brake pressure is regulated independently of the wheel lockup. Therefore, this means in particular that lockup of one wheel per axle is permitted. The brake pressure is regulated in this context independently of the wheels that are (or the wheel that is) locked up.

In particular, this has the technical advantage that it is possible to attain a compromise with respect to braking distance, stability, and steerability.

The fact that wheel lockup is permitted, i.e., the brake pressure is regulated independently of wheel lockup, means in particular that the regulation continues to be performed, unchanged, according to the previously determined traction. The instantaneous regulation of the brake pressure is thus not affected by wheel lockup.

According to another specific embodiment, it is provided that the determination of which of the respective highest tractions for each axle is the lowest traction is performed in that a control signal is selected from a plurality of control signals that are formed based on the respective highest tractions of each vehicle axle. This preferably advantageously simplifies the arbitration and decreases computing time, since it is then only necessary to perform calculations for one regulator per individual wheel brake instead of for four regulators for 4 individual wheel brakes, it being necessary in the case of 4 regulators subsequently to perform arbitration for the 4 regulator outputs and it possibly being necessary to feed the arbitration results back into the 4 regulators, which requires significant computing effort.

According to the present invention, this means that in particular there is single-channel control using one regulator. Therefore, one regulator preferably controls all 4 individual wheel brakes of the vehicle.

The control signal is based, for instance, on the wheel speed. This means, for example, that the control signal is a wheel speed signal.

According to another specific embodiment, it is provided that the determination of which of the respective highest tractions for each axle is the lowest traction includes:
Determining a respective vehicle wheel speed of the vehicle wheels;
Selecting the lowest vehicle wheel speed from the determined vehicle wheel speeds;
Defining that the traction of the vehicle wheel having the lowest vehicle wheel speed is the lowest traction of the respective highest tractions for each axle.

According to one specific embodiment, the program has instructions for performing the steps of the method for operating a vehicle. This applies to all of the described specific embodiments.

According to another specific embodiment, the respective traction of the vehicle wheels is determined based on a respective wheel speed of the vehicle wheels (i.e., on wheel speed information). This means that according to one specific embodiment one speed sensor is provided for each vehicle wheel which is able to detect a wheel speed of the vehicle wheel. The respective traction is then determined based on these wheel speeds, that is, on the wheel speed signals corresponding to these wheel speeds. Wheel speed information from two vehicle wheels of one axle or from all four vehicle wheels or optionally also a mean axle speed is preferably used for determining the respective traction.

DETAILED DESCRIPTION

Figure 1:
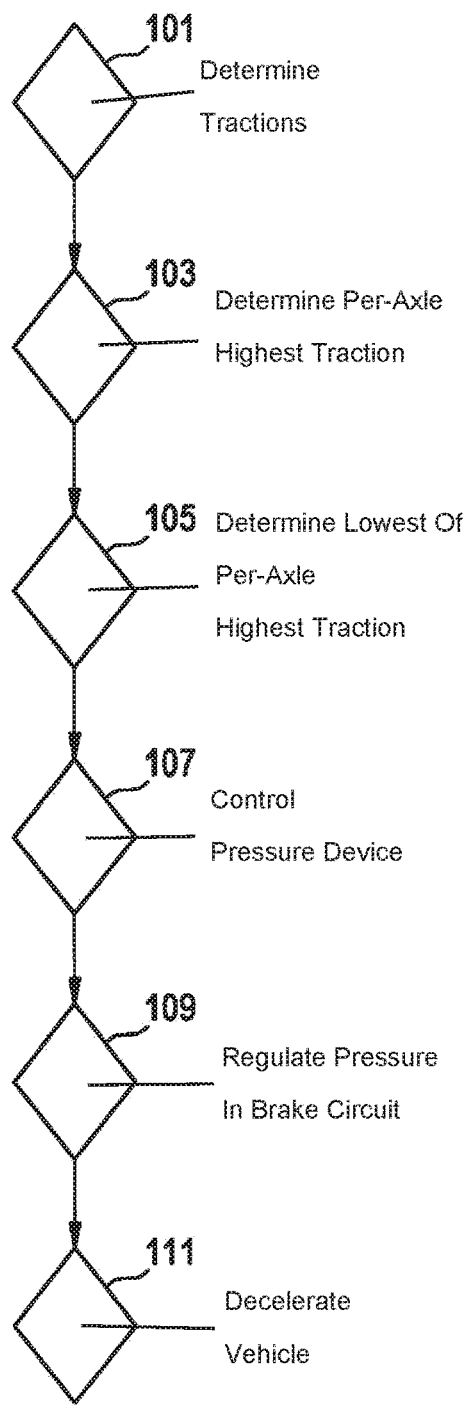
FIG. 1 shows a flowchart of a method for operating a vehicle.

FIG. 1 shows a flowchart of a method for operating a vehicle.

A respective traction of the vehicle wheels is determined according to a step 101. A step 103 determines per axle of the vehicle which of the respective tractions of the vehicle wheels is the highest traction. In a step 105 it is determined which of the respective highest tractions for each axle is the lowest traction. In a step 107 an admission pressure-generating device is controlled as a function of the determined lowest traction of the respective highest tractions for each axle, so that according to a step 109 the admission pressure-generating device regulates a brake pressure in a single-channel brake circuit for the vehicle wheels as function of the determined lowest traction such that in a step 111 the vehicle is decelerated according to the regulated brake pressure.

The pressure that is regulated in the single-channel brake circuit using the admission pressure-generating device is thus preferably modulated such that a suitable compromise is attained with respect to brake performance, stability, and steerability of the vehicle on all driving surfaces, including their transitions. It is in particular provided that the admission pressure-generating device is a brake booster, especially an electromechanical brake booster, for instance an iBooster. The present invention is distinguished in particular in that only the admission pressure-generating device, as the only hardware, and wheel speed information of two vehicle wheels on one axle or of all four vehicle wheels, or optionally also a mean axle speed, are needed for the algorithm according to the present invention, that is, the method steps according to the present invention. It is therefore advantageously not necessary to control additional controllers individually by wheel or individually by brake circuit. Nevertheless, there is still support for a requirement for a possible safe braking operation, especially during autonomous/automated driving, by using the hardware redundancy for actively generating brake pressure, for instance on the one hand with the iBooster and preferably on the other hand with ESP hydraulics.

Figure 2:
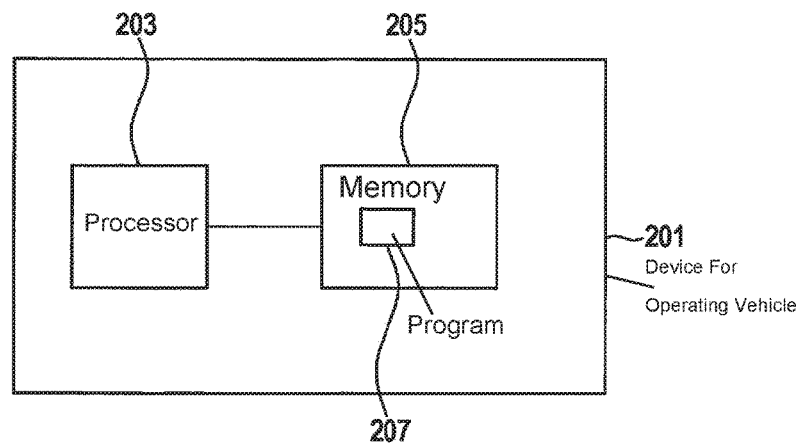
FIG. 2 shows a device for operating a vehicle.

FIG. 2 shows a device 201 for operating a vehicle (not shown).

Device 201 includes processor 203. Device 201 furthermore includes a memory 205. A program 207 is stored in memory 205. Program 207 is configured to be executed on processor 203, program 207 having instructions for:

Determining a particular traction of the vehicle wheels;
Determining for each axle of the vehicle which of the respective tractions of the vehicle wheels is highest;
Determining which of the respective highest tractions for each axle is the lowest traction;
Controlling an admission pressure-generating device as a function of the determined lowest traction of the respective highest tractions for each axle, so that
The admission pressure-generating device is able to regulate a brake pressure in a single-channel brake circuit for the vehicle wheels as a function of the determined lowest traction, so that
The vehicle is able be decelerated according to the regulated brake pressure.

In further specific embodiments (not shown), program 207 includes instructions for performing the steps of the method for operating a vehicle in accordance with at least one of the specific embodiments described herein.

Figure 3:
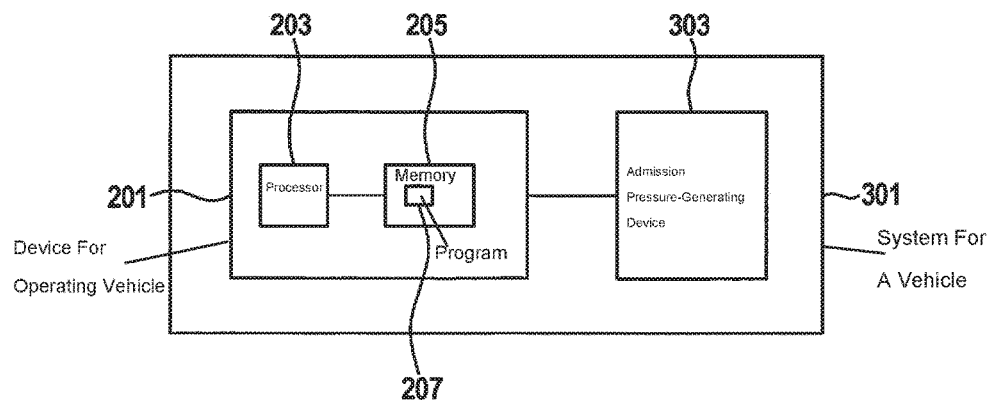
FIG. 3 shows a system for a vehicle.

FIG. 3 shows a system 301 for a vehicle (not shown).

System 301 includes device 201 according to FIG. 2 and a admission pressure-generating device 303. Admission pressure-generating device 303 is designed to regulate a brake pressure in a single-channel brake circuit for the vehicle wheels of the vehicle.

In a specific embodiment (not shown), system 301 includes wheel speed sensors, which are connected to device 201. This means that the wheel speed signals of the wheel speed sensors are able to be provided to device 201. In particular, the respective tractions are then determined based on the wheel speed signals.

In summary, therefore, the present invention includes in particular the idea of performing a single-channel admission pressure variation in the brake circuit for all vehicle wheels using a admission pressure-generating device, in particular using a brake booster. The present invention provides that the Select High principle is first applied per axle for controlling the admission pressure-generating device, the control between the two Select High results being determined via a Select Low arbitration.

What is claimed is:

1. A method for operating a vehicle, comprising:
for each of a plurality of vehicle wheels of the vehicle, determining a respective traction of the respective vehicle wheel;
determining, for each axle of the vehicle which of the respective tractions determined for respective ones of the plurality of vehicle wheels of the respective axle has a highest traction;
determining which of the determined highest tractions is a lowest of the determined highest tractions; and
controlling an admission pressure-generating device to regulate a brake pressure in a single-channel brake circuit for the vehicle wheels as a function of the determined lowest of the determined highest tractions, wherein the vehicle is decelerated according to the regulated brake pressure.

2. The method as recited in claim 1, further comprising:
determining instantaneous tractions of all the vehicle wheels and determining an instantaneous vehicle deceleration during a deceleration according to the regulated brake pressure;
determining which of the determined instantaneous tractions is a lowest of the determined instantaneous tractions in response to the instantaneous vehicle deceleration being greater than or equal to a predefined vehicle deceleration threshold value; and
controlling the admission pressure-generating device to regulate the brake pressure in the brake circuit as a function of the determined lowest instantaneous traction, wherein the vehicle is further decelerated according to the regulated brake pressure.

3. The method as recited in claim 1, further comprising permitting a wheel lockup when up to one vehicle wheel per axle locks up during vehicle deceleration, so that the admission pressure-generating device is controlled independently of the wheel lockup, so that the brake pressure is regulated independently of the wheel lockup.

4. The method as recited in claim 1, wherein the determining of which of the determined highest tractions is the lowest of the determined highest tractions is performed by selecting a control signal from a plurality of control signals that are formed based on the determined highest tractions.

5. The method as recited in claim 1, wherein the determining of which of the determined highest tractions is the lowest of the determined highest tractions includes:
for each of the plurality of vehicle wheels, determining a respective vehicle wheel speed of the respective vehicle wheel;
selecting a lowest vehicle wheel speed from the determined vehicle wheel speeds; and
defining that the determined traction of the vehicle wheel having the lowest vehicle wheel speed is the lowest traction of the respective highest tractions of the respective axles.

6. A device for operating a vehicle, comprising:
a processor;
a memory; and
a program stored in the memory and being configured to be executed on the processor, the program having instructions for:
for each of a plurality of vehicle wheels of the vehicle, determining a respective traction of the respective vehicle wheel;
determining, for each axle of the vehicle, which of the respective tractions determined for respective ones of the plurality of vehicle wheels of the respective axle has a highest traction;
determining which of the determined highest tractions is a lowest of the determined highest tractions; and
controlling an admission pressure-generating device to regulate a brake pressure in a single-channel brake circuit for the vehicle wheels as a function of the determined lowest of the determined highest tractions, wherein the vehicle is decelerated according to the regulated brake pressure.

7. A system for a vehicle, comprising:
an admission pressure-generating device for regulating a brake pressure in a single-channel brake circuit for vehicle wheels of the vehicle; and
a device for operating a vehicle, including:
  a processor;
  a memory; and
  a program stored in the memory and being configured to be executed on the processor, the program having instructions for:
    for each of the vehicle wheels, determining a respective traction of the respective vehicle wheel;
    determining, for each axle of the vehicle, which of the respective tractions determined for respective ones of the plurality of vehicle wheels of the respective axle has a highest traction;
    determining which of the determined highest tractions for each is a lowest of the determined highest tractions; and
    controlling the admission pressure-generating device to regulate the brake pressure in the single-channel brake circuit for the vehicle wheels as a function of the determined lowest of the determined highest tractions, wherein the vehicle is decelerated according to the regulated brake pressure.

8. A non-transitory computer-readable medium on which are stored instructions that are executable by a processor and that, when executed by the processor, cause the processor to perform a method for operating a vehicle, the method comprising:
  for each of a plurality of vehicle wheels of the vehicle, determining a respective traction of the respective vehicle wheel;
  determining, for each axle of the vehicle, which of the respective tractions determined for respective ones of the plurality of vehicle wheels of the respective axle has a highest traction;
  determining which of the determined highest tractions is a lowest of the determined highest tractions; and
  controlling an admission pressure-generating device to regulate a brake pressure in a single-channel brake circuit for the vehicle wheels as a function of the determined lowest of the determined highest tractions, wherein the vehicle is decelerated according to the regulated brake pressure.

* * * * *